March 20, 1956 P. H. CARLSON ET AL 2,738,711
SLOT CUTTING DEVICE
Filed April 29, 1950 4 Sheets-Sheet 1

INVENTOR
Paul H. Carlson
Edwin N. Carlson
Warren E. Carlson
BY Robert M. Dunning
ATTORNEY INVENTOR
Paul H. Carlson
Edwin N. Carlson
Warren E. Carlson
BY Robert M. Dunning ATTORNEY

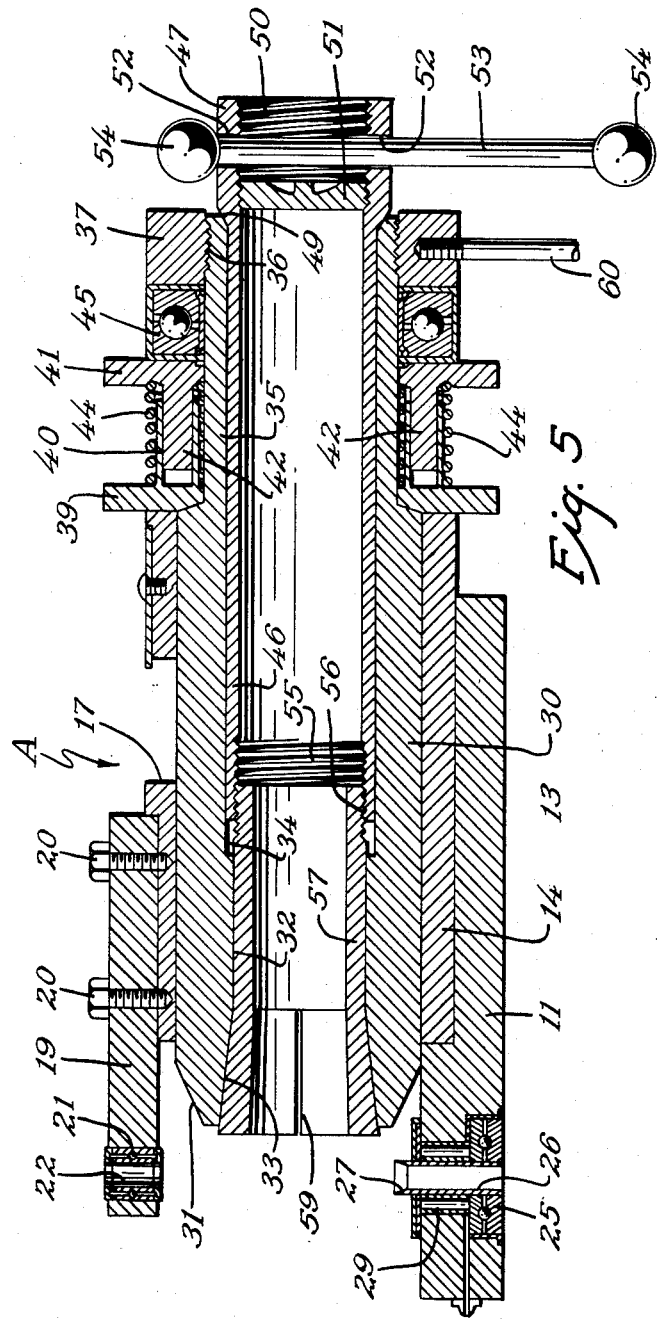
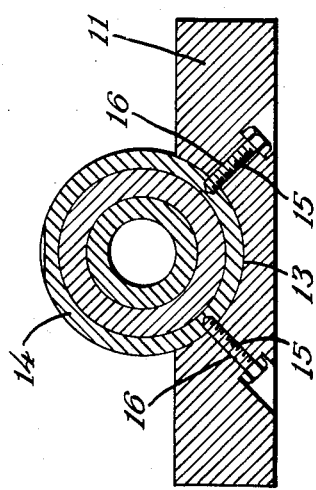

INVENTOR
Paul H. Carlson
Edwin N. Carlson
Warren E. Carlson
BY Robert M. Dunning ATTORNEY

# United States Patent Office 2,738,711
Patented Mar. 20, 1956

2,738,711

SLOT CUTTING DEVICE

Paul H. Carlson and Edwin N. Carlson, St. Paul, and Warren E. Carlson, Stillwater, Minn.

Application April 29, 1950, Serial No. 159,104

1 Claim. (Cl. 90—11.62)

Our invention relates to an improvement in slot cutting device and deals particularly with a device for forming an angular slot in a cylindrical element.

In our previously filed application, Serial No. 699,492, filed September 26, 1946, we described a tool which is useful in removing bolts, nuts, screws, and the like, which have been rusted or otherwise tightly anchored in place. This device includes a cylindrical part having a cam shaped slot therein and a tubular support for this cylindrical element which is so arranged as to cause rotative movement of the cylindrical part upon relative longitudinal movement between the two parts. Considerable difficulty was experienced in forming the cam shaped slot in the cylindrical element. The present device, while capable of several uses, is particularly useful for forming such a cam shaped slot so that it may extend directly through the cylindrical element.

The object of the present invention lies in the provision of a holder for an element to be worked upon and a means for rotatably supporting this element. The device also includes a support for a rotary cutter so that it may intersect the axis of rotation of the element. Means are provided for supporting the element holder for longitudinal movement so that the element being worked upon may rotate between defined limits or may move longitudinally between defined limits.

A feature of the present invention lies in the provision of an apparatus including a cam shaped device for controlling the longitudinal movement of the holder. As a result the longitudinal movement of the element being worked upon may be controlled in proportion to the rotative movement thereof.

A feature of the present invention lies in the provision of a simple means of forming the cam and controlling longitudinal movement of the work holder. In order to form the cam we produce the cam in flat form on sheet metal or the like, and in this form the proper cam shape may be easily produced. The flat cam is next bent into partially cylindrical form so as to produce a ring-shaped cam cooperable with the work holder.

These and other objects and novel features of our invention will be more clearly and fully set forth in the following specification and claim.

In the drawings forming a part of our specification:

Figure 5 is a longitudinal section showing the arrangement of parts of the device.

Figure 6 is a sectional view through the detailed portion of the structure, the position of the section being indicated by the line 6—6 of Figure 2.

Figure 1:
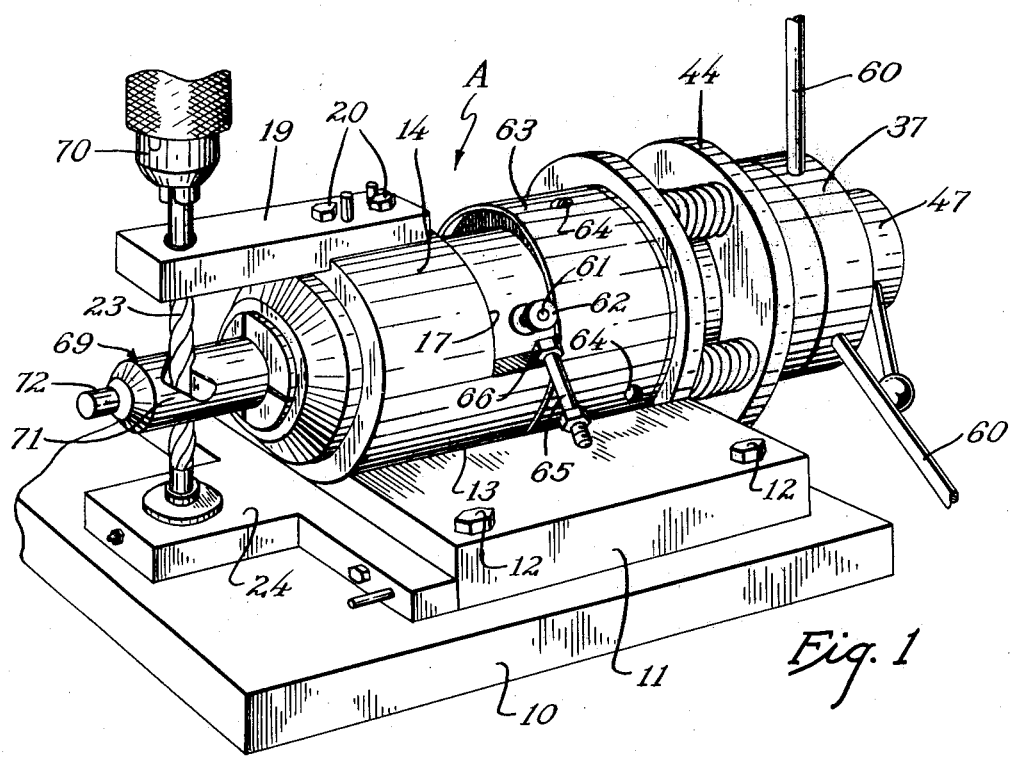
Figure 1 is a perspective view of our device showing in general the construction thereof.

The apparatus for holding parts to be cut or slotted is indicated in general by the letter A. This device includes a base panel 10 having a mounting yoke 11 secured thereto by bolts 12 or other suitable means. The yoke 11 comprises a flat block of metal or the like having a channel shaped groove 13 therein. The groove 13 is designed to accommodate the cylindrical housing 14 of the apparatus A.

As best illustrated in Figure 6 of the drawings, the housing 14 comprises an elongated sleeve fitting snugly in the groove 13. The housing is held in place in the groove by cap screws or bolts 15 extending through diagonally arranged apertures 16 in the yoke 11. The bolts 15 extend radially into the housing 14 to hold the same in place.

Figure 2:
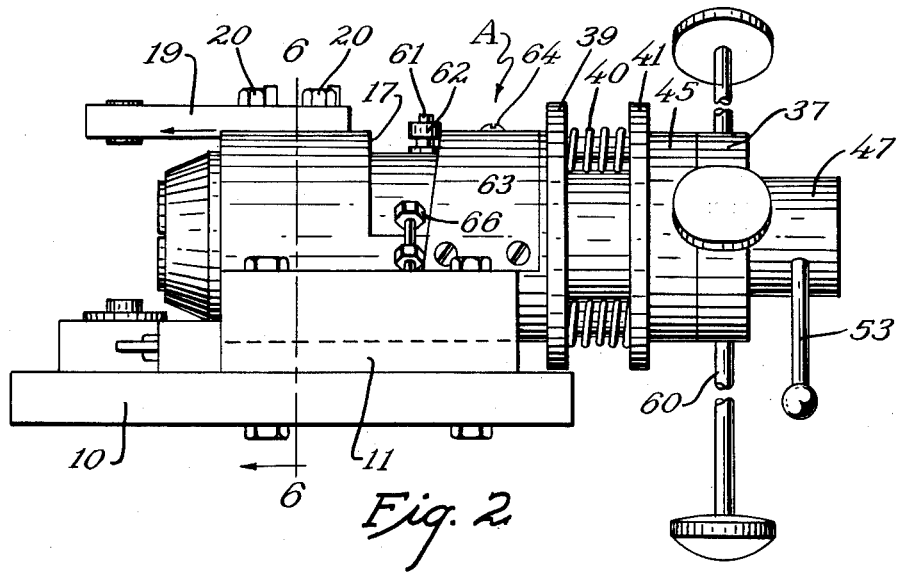
Figure 2 is a side elevational view of the apparatus.

As indicated in Figures 1, 2, and 5 of the drawings, the housing 14 is provided with a slot 17 therein which extends through the upper portion of the sleevelike housing. The slot 17 extends downwardly to approximately the center line of the housing 14 to expose a portion of the internal mechanism. A bracket 19 is secured by bolts 20 or other suitable means to the keeper surface of the housing 14. This bracket 19 extends parallel to the base plate 10 and projects beyond the end of the housing 14. A ball or roller bearing 21 is supported by the bracket 19 near the outer end thereof. The inner sleeve 22 of the bearing 21 is designed to accommodate the rotary cutter blade 23.

As indicated in Figure 1 of the drawings, a supplemental base plate 24 projects upwardly from the base plate 10. A bearing 25 is supported in the base plate 10 in coaxial relation with the bearing 21. The bearing 25 supports a vertically extending sleeve 26 which is in axial alignment with the bearing 21 and is provided with a flared or tapered inlet end 27. The sleeve 26 is also supported by a roller bearing 29 which encircles the sleeve and permits the sleeve to rotate freely. The sleeve 26 is designed to accommodate the lower end of the cutting tool 23. In other words, the cutting tool is rotatably supported in the bearing sleeve 22 and the aligned sleeve 26 which are located above and below the axis of the cylindrical housing 14.

The housing sleeve 14 supports an inner sleeve 30. This inner sleeve is provided with an inwardly tapering forward end 31 and is provided with a bore 32 therethrough which flares outwardly at its forward end as indicated at 33. The bore 32 communicates with the slightly larger diameter bore 34 which extends the remaining length of the inner sleeve 30. The outer diameter of the sleeve 30 is uniform throughout the length of the outer housing sleeve 14. However, at the rear extremity of the housing sleeve 14, the outer diameter is cut down to provide a relatively smaller diameter rear end 35. The end of the reduced diameter portion 35 is threaded as indicated at 36 to accommodate an internally threaded collar 37.

Figure 7:
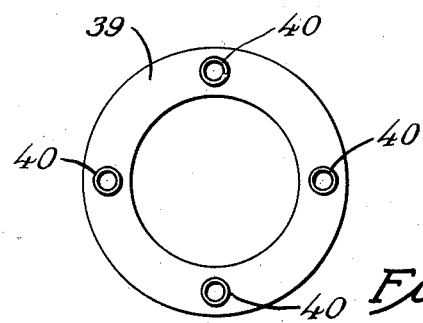
Figure 7 is an elevation view of one of the parts of our device.
Figure 8:
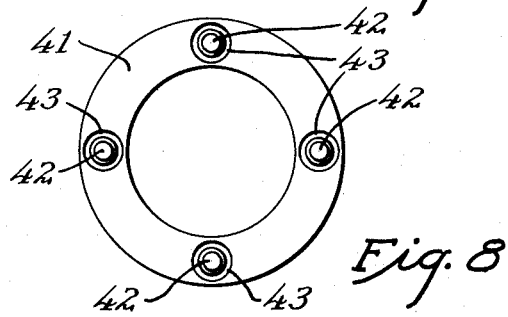
Figure 8 is an elevation view of a cooperable part of the device.

A bearing ring 39 encircles the small diameter portion 35 of the sleeve 30. As indicated in Figures 5 and 7 of the drawings the ring 39 is provided with a series of angularly spaced tubular guides 40 projecting therefrom. A second ring shaped bearing member 41 likewise encircles the reduced diameter portion 35 of the sleeve 30. As shown in Figures 5 and 8 of the drawings, the ring 41 is provided with integral angularly spaced guide pins or projections 42 thereupon. Circular grooves 43 encircle the pins 42 in the ring 41. The guide pins 42 extend into the sleeves 40 and thus hold the rings 39 and 41 from relative rotation. Springs 44 encircle the guide sleeves 40 so as to urge the rings 39 and 41 apart.

A thrust bearing 45 encircles a small diameter portion 35 of the sleeve 30 and is interposed between the ring 41 and the threaded collar 37. Thus thrust may be exerted against the collar 37 by the springs 44 without tending to rotate the rings 39 and 41.

A tubular sleeve 46 is supported within the sleeve 30 and is rotatable within the bore 34 thereof. The sleeve 46 is provided with an enlarged diameter end 47 which is connected to the remainder of the sleeve at an inclined shoulder 49. The shoulder 49 engages against the end of the sleeve 30 and holds the sleeve 46 from extending into the sleeve 30 in its entirety. The enlarged diameter end 47 is internally threaded as indicated at 50 to accommodate a plug closure 51. The sleeve end 47 is provided with a pair of diametrically opposed apertures 52 for accommodation of an operating handle 53. The handle 53 is preferably provided with enlarged ends 54 and is freely slidable in the apertures 52.

The forward end of the sleeve 46 is internally threaded as indicated at 55. The threads 55 engage external threads 56 on a chuck sleeve 57. The chuck sleeve 57 is provided with radially spaced slots 59 which act to divide the forward end of this chuck into a series of spaced jaws. The outer surface of the jaw end of the chuck 57 is outwardly tapered to fit the inward taper 33 of the sleeve 30.

The chuck sleeve 57 is of sufficiently resilient material to permit the jaws to contract somewhat to hold a cylindrical shank and to hold the same from rotation relative to the chuck sleeve 57. The chuck sleeve 57 is preferably held from rotation relative to the sleeve 30 although friction between these elements may be sufficient to hold the two parts from relative rotation.

It will be noted that by rotating the handle 53 to rotate the sleeve 46 the chuck sleeve 57 may be moved rearwardly into the tapered end 33 of the bore 32, thereby contracting the jaw end of the chuck to clamp an object engaged therein. Upon rotation of the handle 53 in the opposite direction the chuck 57 may move in the opposite direction, thereby releasing the object clamped.

A series of radially extending arms 60 are provided on the collar 37 for rotation in unison therewith. By rotating the collar 37, the sleeve 30, together with the chuck sleeve 57 may be rotated. When an object is clamped within the chuck 57, rotation of the sleeve 30 will also rotate the sleeve 46. As a result by manipulating the arms 60 the sleeve 30 may be rotated.

Figure 3:
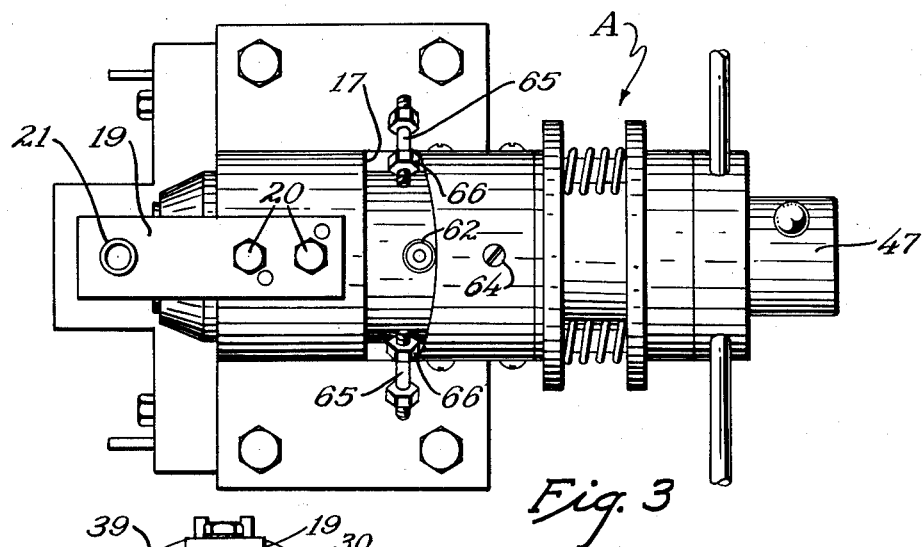
Figure 3 is a top plan view of the apparatus.
Figure 4:
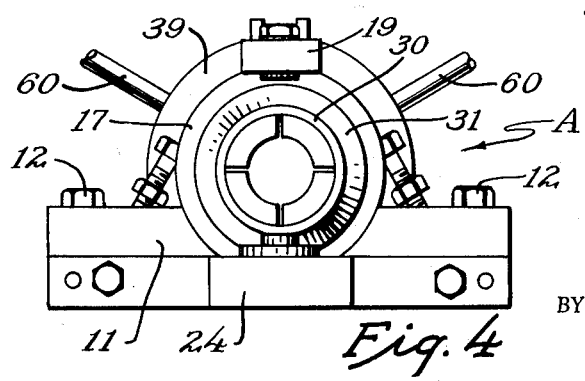
Figure 4 is a front elevational view of the device.

As best indicated in Figures 1, 2, and 3 of the drawings a pivot 61 extends radially from the sleeve 30 within the slot 17. The pivot 61 supports a cam roller 62. The cam roller 62 is engageable with a cam 63 secured to the housing sleeve 14 by cap screws 64 or the like. Thus as the sleeve 30 is rotated the cam roller 62 will follow the contour of the cam 63. The cam roller 62 is held against the cam 63 by the springs 44.

A pair of studs 65 project from the yoke 11 on opposite sides of the housing 14. Nuts 66 on the studs 65 are engageable with the cam roller 62, to limit movement of this cam roller in either direction. Thus the oscillation of the sleeve 30 is determined.

The manner in which the cam 63 is constructed is of importance. It is relatively easy to form a cam profile on a flat sheet of material and it is considerably more difficult to provide the desired profile on an arcuate surface. Thus the cam 63 is constructed to provide a curved edge 67 providing the desired contour.

In constructing the slotted element 69 the element is first mounted in the chuck end of the sleeve 57 and clamped in place. A drill may then be inserted in a drill press chuck 70 or other suitable driven fixture and extended through the sleeve 21, and a hole is drilled through the supported element 60. In order to slot the part, the drill is removed and replaced by a rotary cutter capable of cutting laterally through the metal. This cutter is inserted through the sleeve 21, through the drilled aperture in the supported piece 69 and into the sleeve 26 so that the cutting tool is supported on opposite sides of the cutting location.

By oscillating the sleeve 30 throughout its limits of oscillation, a slot of the desired contour will be cut in the member 69. As the sleeve oscillates it is forced longitudinally by the cam roller 62. The resultant cam slot in the member 69 is shown of V formation and is indicated in Figure 1 at 71. However, any desired shape of slot may be cut into the member 69 by merely changing the contour of the cam 63.

Figure 9:
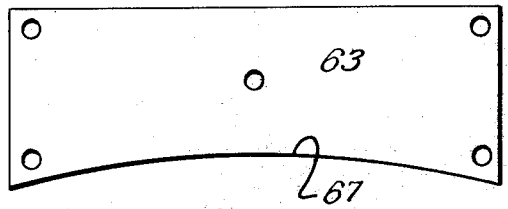
Figure 9 is a diagrammatic view of the cam portion of the device.

An observation of Figure 9 of the drawings will show that the cam edge 67 is lowest at its center point and is highest at opposite ends. As a result the center of the slot 71 will be farthest from the reduced diameter end 72 of the member 69, while the ends of the slot will be nearer this reduced diameter end. As the axis of the cutter 23 extends through the axis of the member 69, the slot is identical on opposite sides of the cylindrical member 69.

It will be noted that the shape of the element 69 may be varied considerably while accomplishing the same result. This element 69 need not necessarily be cylindrical in outer shape as long as the same type of slot is to be formed on opposite sides of a center of rotation. Similarly the member 69 may be hollow and sleeve-like in form rather than solid, if desired. By merely forming the edge 67 to extend along a straight line which is inclined relative to the opposite edge of the cam, the slot may comprise a single inclined slot structure rather than a V-shaped slot as illustrated. Furthermore, by shaping the cam edge 67 with notches or other irregularities, a similar shape of slot may be produced in the member 69.

Figure 10:
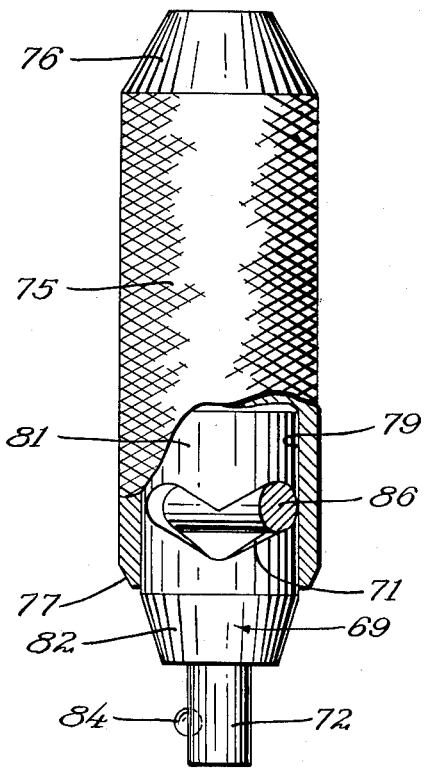
Figure 10 is an elevation view of the tool produced by the apparatus, a portion of the tool being broken away to show the internal construction thereof.
Figure 11:
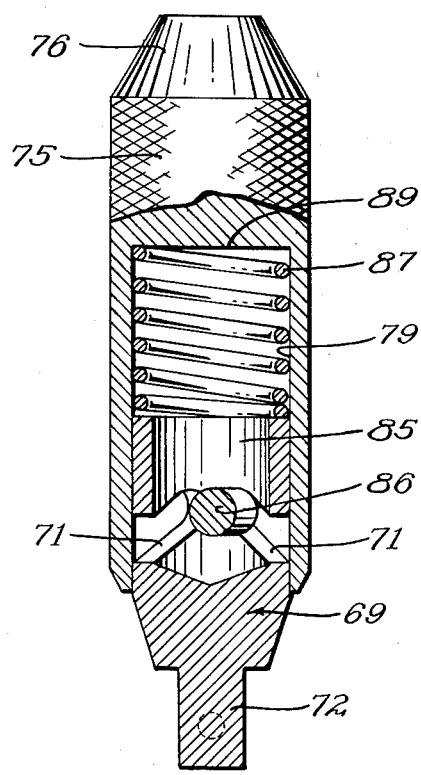
Figure 11 is a longitudinal section through the tool.

The tool which we produce through the use of our apparatus is best illustrated in Figures 10 and 11 of the drawings.

This tool includes an elongated generally cylindrical body 75 having a tapered frusto-conical end 76 and a slightly tapered opposite end 77. An axial recess 79 extends into the end 77 of the handle body. A relatively rotatable plunger 69 is supported in the aperture 79. The element 69 includes a cylindrical portion 81 which fits with a running fit within the aperture 79, a tapered portion 82 on the cylindrical portion 81, and a rectangular or multi-sided shank 72 projecting axially therefrom. The shank 72 is provided with a ball 84 recessed thereinto and spring urged outwardly so as to provide a detachable connection with a screw driver end, a wrench socket end or the like.

As best illustrated in Figure 11 of the drawings, the element 69 is provided with an axial recess 85 therein in which the desired slot 71 is formed. The slot 71 is V-shaped in form and the member 69 is provided with two slots of similar shape in opposite sides of the element. The cutting tool 23 extends through a hole drilled through the cylindrical portion 81 of the member 69 and thus cuts the slot similarly on opposite sides of the element.

A pin 86 extends through the slots 71 and through the walls of the body 75 being anchored in place. The pin 86 remains solidly in place during the operation of the tool and does not move relative to the handle. A spring 87 is interposed between the member 69 and the base 89 of the recess 79 to normally urge the element 69 outwardly.

When the socket wrench of a screw driver bit mounted upon the shank 72 is placed against a screw or bolt and the handle of the tool is hit a sharp blow on the end 76 thereof, the element 69 rotates relative to the handle in a manner to loosen the bolt or nut. The device may similarly be used to tighten a bolt or nut by rotating the elements 69 relative to the handle until the opposite end of the slot 71 embraces the pin 86. In other words, when the pin 86 is at one end of the slot the member 69 will be rotated in one direction and when the pin is normally located at the other end of the slot, the element 69 will rotate it in the opposite direction. The member 69 does not ordinarily rotate far enough when it is struck to swing the pin 86 from one end of the slot to the other.

In accordance with the patent statutes, we have described the principles of construction and operation of our slot cutting device, and while we have endeavored to set forth the best embodiments thereof, we desire to have it understood that these are only illustrative thereof and that obvious changes may be made within the scope of the following claims without departing from the spirit of our invention.

We claim:

A slot cutting device including a housing provided with an arcuate surface, the housing having an opening therein, a work support slidably and rotatably supported by said housing, a peripheral flange adjoining said housing and encircling said work support, a ring shaped element encircling said work support in spaced relation to said flange, resilient means urging said ring-shaped element away from said flange, bearing means on said work support against which said ring shaped element may engage, a cam on said housing comprising a sheet of material of substantially uniform thickness curved to fit said arcuate surface, being detachably secured thereto, and with a portion of one edge thereof projecting partially over said opening, a cam follower on said work support, said cam follower extending through said opening, rotation of said work support moving said cam follower along said cam to impart axial movement to said work support, and a cutter rotatably supported in the path of movement of work in said work support.

References Cited in the file of this patent

UNITED STATES PATENTS

| | | |
|---|---|---|
| 901,722 | Milne | Oct. 20, 1908 |
| 1,232,296 | Hall et al. | July 3, 1917 |
| 1,272,068 | McClure et al. | July 9, 1918 |
| 1,445,898 | Lutz | Feb. 20, 1923 |
| 1,731,979 | Krummel | Oct. 15, 1929 |
| 1,742,040 | Lynch et al. | Dec. 31, 1929 |
| 2,104,267 | Melin | Jan. 4, 1938 |
| 2,339,355 | Rutten | Jan. 18, 1944 |
| 2,366,247 | Fauser | Jan. 2, 1945 |
| 2,386,146 | Shaeffer | Oct. 2, 1945 |